Nov. 3, 1942.   F. H. GOODING   2,300,666
ELECTRIC POWER CABLE
Filed April 25, 1941
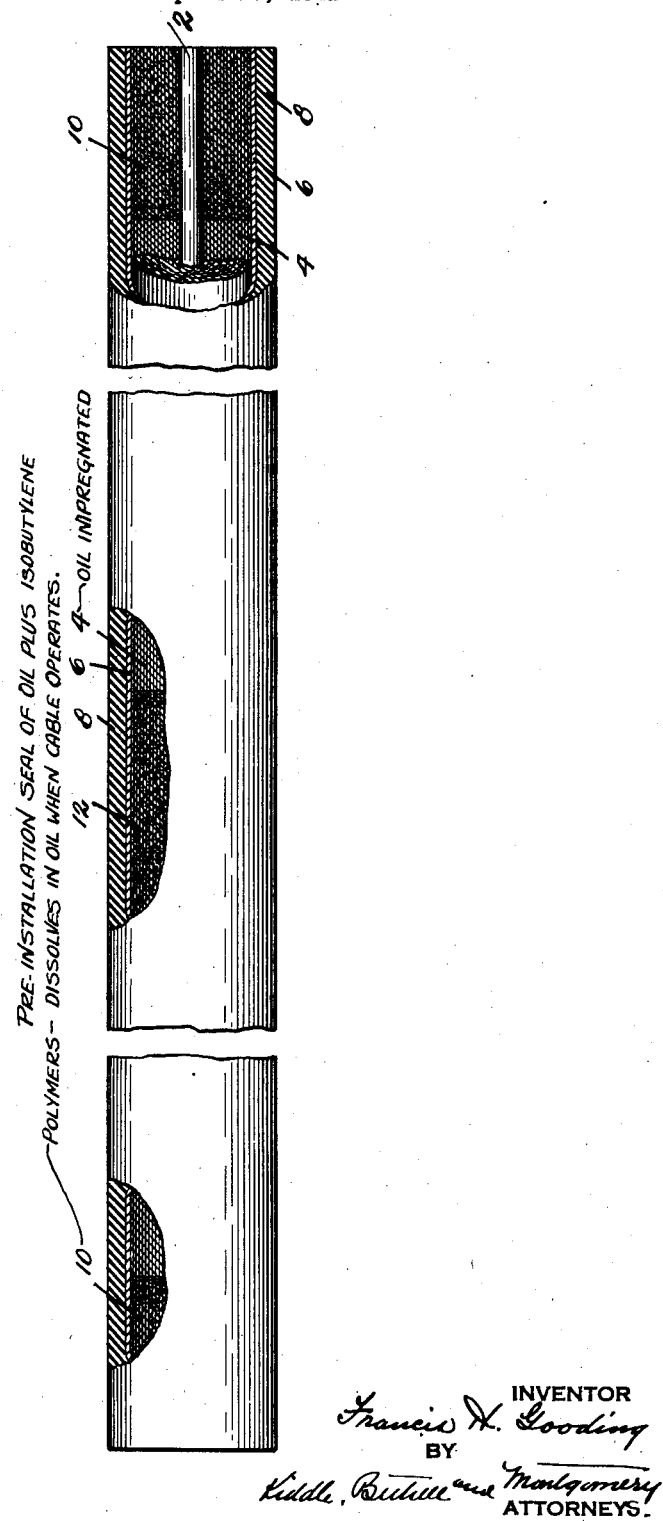
INVENTOR
Francis H. Gooding
BY
Kiddle, Buttell and Montgomery
ATTORNEYS.

Patented Nov. 3, 1942

2,300,666

UNITED STATES PATENT OFFICE 2,300,666

ELECTRIC POWER CABLE

Francis H. Gooding, Lodi, N. J., assignor to The Okonite-Callender Cable Company, Incorporated, Paterson, N. J., a corporation of New Jersey Application April 25, 1941, Serial No. 390,249

3 Claims. (Cl. 174—10)

This invention is directed to a new and improved construction in oil impregnated electric power cables, and has for one of its objects the provision of a construction wherein bleeding of the cable when splicing or jointing the cables is eliminated.

In the manufacture of oil impregnated electric power cables, it is customary to impregnate the cable either before or after sheathing, but on installation it is difficult to joint or splice the cable, without considerable loss of the impregnating oil. This is referred to technically as "bleeding" and it is one of the primary objects of my invention to overcome this difficulty.

In effect I propose to plug the cable at the ends and/or wherever the cable is to be cut with a heavy insulating compound which will not bleed, so that joints and splices can be made without loss of the impregnating fluid, this compound, however, being of such a nature that in the operation of the cable it will be absorbed by the impregnating fluid and the normal desired freedom of movement of the impregnating fluid in the cable will not be impaired.

In the accompanying drawing I have shown a part sectional elevational view of a cable embodying my invention.

It is to be understood that the invention is applicable to all types of oil impregnated cables, and that the showing in the drawing is merely illustrative and not definitive.

Referring to the drawing: 2 designates the conductor of an oil-impregnated single conductor electric power cable. This conductor, as is customary, is insulated with an oil impregnated insulation, paper tape, for example, designated 4.

Immediately about the insulation 4 is a metal electrostatic shielding tape 6 while 8 designates the cable sheath usually lead or a lead alloy.

The impregnating fluid employed in the cable may be any of the usual insulating compounds.

It is understood, of course, that in the manufacture of the cable it has been thoroughly dried, evacuated and impregnated before it leaves the plant.

It will be appreciated also that on installing the cable the same will have to be terminated at the ends and cut and spliced at intervals of several hundred feet depending upon the spacing of the manholes of the system, and that the cable will bleed at these points. This is very detrimental to the cable inasmuch as the loss of any of the impregnating compound tends to promote the formation of voids in the insulation, eventually resulting in cable breakdown. To avoid this trouble I force a heavy insulating compound into the cable ends, as indicated at 10. This work is done before the cable leaves the plant. The compound has two essential characteristics; it must be heavy enough to prevent bleeding of the cable when the cable ends are opened, and it must be of such a nature that it will be absorbed by the impregnating oil of the cable after the cable is put in service. A usable compound for this purpose is obtained by blending insulating oil with isobutylene polymer known commercially as "Vistanex." This slug of compound may extend into the cable for any distance that may be practicable, but, in any event, the slug is of sufficient length to ensure the accomplishment of my purpose. Twenty feet at the ends of the cable is a practicable length. If the manufacturer knows where the cable is to be cut when installed, he may insert the heavy compound at these points also, as indicated at 12 on the accompanying drawing, otherwise these slugs may be inserted at the installation site.

It will be understood that the compound making up the intermediate slugs 12 may be introduced with a pressure gun inserted through the cable sheath, and that these slugs will be twice the length of the slugs 10 because the cable, of course, will be cut intermediate the ends of the slugs.

I have found that on installation there is practically no bleeding of the cable when splicing and jointing and inasmuch as the heavy compound is absorbed by the impregnating fluid of the cable movement of the oil in the cable when in operation is not impaired so that the advantages of an oil filled cable are retained.

It will be appreciated that my invention involves practically no additional expense, no change being necessary in the usual methods employed for impregnation, the only additional expense being that incurred in the material and labor required for the compound slugs.

What I claim is:

1. The method of cable making, which method comprises the introduction of a heavy insulating compound into a portion of a length of lead sheathed, oil impregnated, electric power cable where the cable is to be opened for joining purposes and prior to opening the cable, this compound being of such a nature as eventually to be absorbed by the impregnating oil of the cable as the cable is operated and of such viscosity as to prevent escape of any substantial amount of the impregnating oil when the cable is opened.

2. The herein described method of cable making, which method comprises forcing a slug of insulating compound into a portion of a length of lead sheathed, oil-impregnated, electric power cable where the cable is to be cut for joining purposes and prior to cutting the cable, this compound being of higher viscosity than the insulating oil of the cable, thereby to prevent bleeding of the cable when the cable is cut at the area of introduction of the compound and of such a nature as to be absorbed by the impregnating oil of the cable when the cable is operated whereby movement of the impregnating oil is unimpaired.

3. The herein described method of cable making, which method comprises forcing a slug composed of a mixture of insulaitng oil and an isobutylene polymer into a portion of a length of lead sheathed, oil-impregnated, electric power cable where the cable is to be cut for joining and prior to cutting the cable, the slug preventing bleeding of the cable when cut at the area of introduction of the said material and eventually being absorbed by the insulating oil of the cable.

FRANCIS H. GOODING.